United States Patent
Albright et al.

(10) Patent No.: US 10,601,771 B2
(45) Date of Patent: Mar. 24, 2020

(54) INITIAL CONFIGURATION OF A REMOTE NETWORK DEVICE

(71) Applicant: ADTRAN, INC., Huntsville, AL (US)

(72) Inventors: Douglas T. Albright, Huntsville, AL (US); Neil Jensen, Huntsville, AL (US); Jack Atkinson, Huntsville, AL (US); Chip Boling, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 198 days.

(21) Appl. No.: 15/821,082

(22) Filed: Nov. 22, 2017

(65) Prior Publication Data

US 2019/0158458 A1    May 23, 2019

(51) Int. Cl.
*H04L 29/12* (2006.01)
*H04L 12/24* (2006.01)

(52) U.S. Cl.
CPC ...... *H04L 61/2015* (2013.01); *H04L 41/0803* (2013.01); *H04L 61/6018* (2013.01)

(58) Field of Classification Search
CPC ............. H04L 61/2015; H04L 61/6018; H04L 41/0803
See application file for complete search history.

(56) References Cited

U.S. PATENT DOCUMENTS

2013/0268686 A1* 10/2013 Wang ................. H04L 65/1069 709/228
2015/0334085 A1* 11/2015 Li ....................... H04L 61/2015 709/245

\* cited by examiner

*Primary Examiner* — Wing F Chan
*Assistant Examiner* — Billy H Ng
(74) *Attorney, Agent, or Firm* — Fish & Richardson P.C.

(57) ABSTRACT

Methods, systems, and apparatus for configuring a network device are disclosed. In one aspect, a network address that is assigned to the network device by a network address server is detected by an equipment configuration device. The network address server differs from the network device. In response to detecting the network address, a set of connection parameters that connect the network device to a controller device is transmitted by the equipment configuration device and to the network device. The set of connection parameters is transmitted outside of communications, transmitted by the network address server, that assigned the network address to the network device.

12 Claims, 4 Drawing Sheets

INITIAL CONFIGURATION OF A REMOTE NETWORK DEVICE

BACKGROUND

This specification relates to initial configuration of a network device in a Software Defined Network (SDN).

For example, in an OpenFlow network, OpenFlow controllers control routing at OpenFlow switches by sending flow tables to the OpenFlow switches. When a new OpenFlow switch joins the OpenFlow network, the OpenFlow switch needs to know how to initially connect to an OpenFlow controller before communicating with the OpenFlow controller for its flow table.

SUMMARY

In general, one innovative aspect of the subject matter described in this specification can be embodied in methods for initial configuration of a network device to connect to a controller device. One example computer-implemented method includes detecting, by an equipment configuration device, a network address that is assigned to a network device by a network address server, the network address server different from the network device, and in response to detecting the network address, transmitting, by the equipment configuration device and to the network device, a set of connection parameters that connect the network device to a controller device, the set of connection parameters transmitted outside of communications, transmitted by the network address server, that assigned the network address to the network device.

Particular embodiments of the subject matter described in this specification can be implemented so as to realize one or more of the following advantages. For example, the methods, devices, and/or systems described in the present disclosure can configure a network device when the network device joins a network. The network device receives a response, including an assigned network address (e.g., a leased network address, such as an Internet Protocol (IP) address), from a network address server after sending (e.g., broadcasting) a request to the network address server. An equipment configuration device, different from the network address server, detects that a network address has been assigned to the network device. In response to the detection, the equipment configuration device automatically transmits, to the network device, information on how to connect to a controller device (e.g., a network address of the controller). In doing so, the information on how to connect to a controller device does not need to be embedded in the response transmitted by the network address server to the network device. As a result, an existing procedure (e.g., Dynamic Host Configuration Protocol (DHCP)) that is carried out between the network device and the network address server for assigning a network address does not need to be modified, while enabling the initial configuration of the network device outside of the existing procedure. For example, the techniques discussed throughout this document enable an equipment configuration device to communicate the location of a software defined network (SDN) controller to the network device without having to embed the location of the SDN controller into the DHCP packet.

While some aspects of this disclosure refer to computer-implemented software embodied on tangible media that processes and transforms data, some or all of the aspects may be computer-implemented methods or further included in respective systems or devices for performing the described functionality. The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
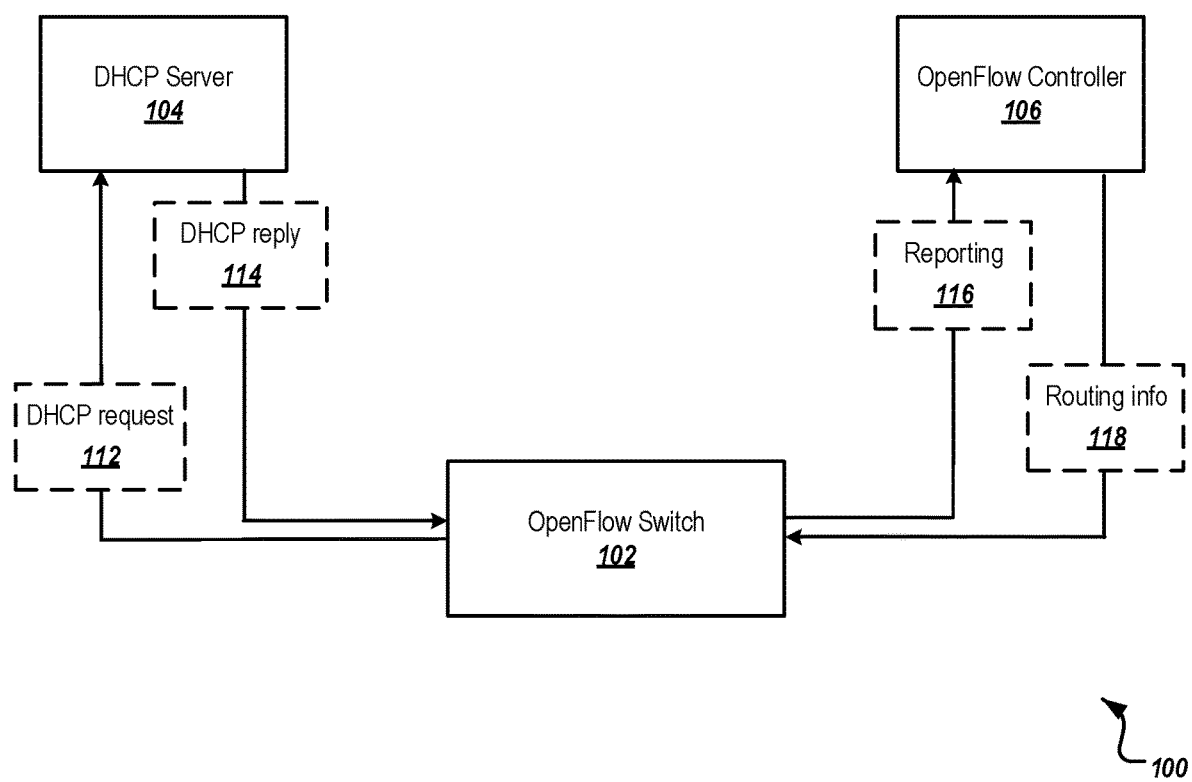
FIG. 1 is a block diagram of an example prior art interaction environment for initial configuration of an OpenFlow switch.

This document describes methods, systems, and apparatus for configuring a network device (e.g., an OpenFlow switch). In some implementations, an equipment configuration device (e.g., an OpenFlow Configuration Point) configures the network device to connect to a controller device (e.g., an OpenFlow controller), and the configuring is triggered by Dynamic Host Configuration Protocol (DHCP) communication, in a Software Defined Network (SDN). For example, when a new OpenFlow switch joins a OpenFlow network, the OpenFlow switch receives initial configuration information (e.g., an Internet Protocol (IP) address of an OpenFlow controller and/or encryption keys used in communication with the OpenFlow controller) from an OpenFlow Configuration Point, different from a DHCP server from which an assigned network address is received. Although this disclosure refers to OpenFlow networks for purposes of example, the subject matter of this document can be applied to other types of SDNs.

In an OpenFlow network, OpenFlow controllers control routing at OpenFlow switches by sending flow tables to the OpenFlow switches. When a new OpenFlow switch joins the OpenFlow network, the OpenFlow switch needs to know how to initially connect to an OpenFlow controller (i.e., the initial configuration information) before communicating with the OpenFlow controller for its flow table. The initial configuration information (e.g., an IP address of the OpenFlow controller and/or encryption keys used in communication with the OpenFlow controller) can be manually entered on the OpenFlow switch, for example, by a network operator.

Manually entering initial configuration information on each OpenFlow switch is expensive, time consuming, and increases the risk of error, especially when the OpenFlow network includes many OpenFlow switches. The following disclosure describes several techniques for initial configuration of a network device. In some implementations, when a network device joins a network, the network device transmits (e.g., broadcasts) a network address request to a network address server. In response to receiving the request, the network address server assigns and transmits a network address (e.g., a leased network address) to the network device. An equipment configuration device, different from the network address server, detects that a network address has been assigned to the network device based on, for example, a notification from the network address server or a network packet snooping device within the network. In response to the detection, the equipment configuration device, not the network address server, automatically transmits initial configuration information (e.g., a network address of a controller device and/or encryption keys used in communication with the controller device) to the network device for initial configuration of the network device. The initial configuration information is used by the network device, for example, to establish a communication link with the controller device. In addition, the initial configuration information is transmitted to the network device outside of communications, transmitted by the network address server that assigned the network address to the network device.

FIG. 1 is a block diagram of an example prior art interaction environment 100 for initial configuration of an OpenFlow switch 102. As illustrated in FIG. 1, the interaction environment 100 includes the OpenFlow switch 102, a Dynamic Host Configuration Protocol (DHCP) server 104, and an OpenFlow controller 106.

Before the OpenFlow switch 102 can communicate with the OpenFlow controller 106 to acquire routing information (e.g., flow table), the OpenFlow switch 102 needs to know how to initially connect to the OpenFlow controller 106. As illustrated in FIG. 1, the OpenFlow switch 102 first broadcasts a DHCP request 112. In response to the DHCP broadcast 112, the DHCP server 104 sends a DHCP reply 114 to the OpenFlow switch 102. The DHCP reply 114 includes an Internet Protocol (IP) address of the OpenFlow controller 106. Then, the OpenFlow switch 102 sends a reporting message 116 to the OpenFlow controller 106 to establish a connection with the OpenFlow controller 106, according to the IP address of the OpenFlow controller 106 sent from the DHCP server 104. After the connection between the OpenFlow switch 102 and the OpenFlow controller 106 has been established, the OpenFlow controller 106 can send routing information 118 to the OpenFlow switch 102.

Figure 2:
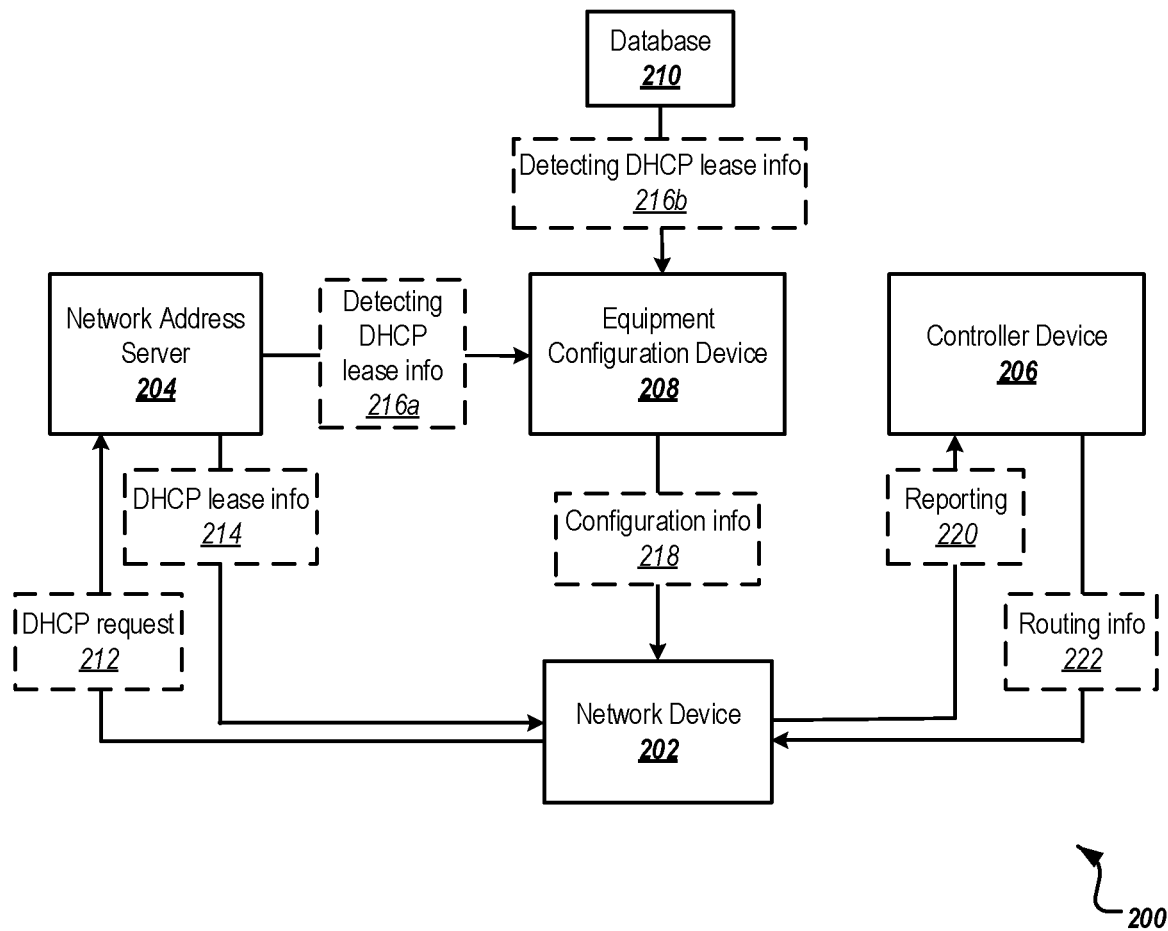
FIG. 2 is a block diagram of an example interaction environment for initial configuration of a network device, according to an implementation of the present disclosure.

FIG. 2 is a block diagram of an example interaction environment 200 for initial configuration of a network device 202, according to an implementation of the present disclosure. The configuration of the network device 202 differs from the configuration described with reference to the prior art interaction environment 100, for example, because the configuration information is not provided in a DHCP reply, but rather is provided to the network device 202 outside of the DHCP reply. As illustrated in FIG. 2, the interaction environment 200 includes the network device 202, a network address server 204, a controller device 206, an equipment configuration device 208, and a database 210. In some implementations, the interaction environment 200 may include additional and/or different components not shown in the block diagram, such as a network packet snooping device, one or more controller devices, another type of network address server that provides network address services, or a combination of these and other technologies. In some implementations, components may also be omitted from the interaction environment 200. The components illustrated in FIG. 2 may be similar to, or different from, those described in FIG. 1.

At 212, the network device 202 transmits a DHCP request to the network address server 204. In some implementations, the DHCP request is broadcast if the network device 202 does not know the network address of the network address server 204. In some implementations, the DHCP request is a request for a network address (e.g., an IP address) from the network address server 204.

At 214, in response to the DHCP request 212, the network address server 204 assigns a network address (e.g., an IP address) to the network device 202 and transmits the assigned network address in a DHCP lease to the network device 202.

The equipment configuration device 208 can detect that a network address (e.g., an IP address) has been assigned to the network device 202. In some implementations, at 216a, the network address server 204 notifies the equipment configuration device 208 that a network address has been assigned to the network device 202 (e.g., by transmitting the DHCP lease to the equipment configuration device 208). In some implementations, at 216b, the equipment configuration device 208 snoops DHCP lease files stored in the database 210 to detect that a network address has been assigned to the network device 202 (e.g., by detecting newly stored DHCP lease in the database 210). The database 210 can receive and/or store DHCP lease files transmitted by the network address server 204. In some implementations, a network packet snooping device monitors and analyzes packets transmitted by the network address server 204 to determine whether a network address has been assigned to the network device 202. Once the network packet snooping device detects that a network address has been assigned to the network device 202, the network packet snooping device notifies the equipment configuration device 208. In some implementations, the equipment configuration device 208 itself monitors and analyzes packets transmitted by the network address server 204 to determine whether a network address has been assigned to the network device 202.

At 218, in response to detecting that a network address has been assigned to the network device 202, the equipment configuration device 208 automatically transmits configuration information to the network device 202, for example, using the assigned network address as a destination address. In some implementations, the configuration information includes a network address (e.g., an IP address) of the controller device 206 and/or security information required to establish a connection with the controller device. In some implementations, the security information includes a set of encryption keys that can be used to direct the network device 202 to connect to the controller device 206. The configuration information received by the network device 202 is not received from the network address server (e.g., not embedded in the DHCP lease transmitted, at 214, from the network address server 204 to the network device 202). In some implementations, the communications between the equipment configuration device 208 and the network device 202 use an Open vSwitch Database (OVSDB) management protocol or an OpenFlow Management and Configuration (OF-CONFIG) protocol, instead of a Dynamic Host Configuration Protocol (DHCP).

In some implementations, the operations performed by the equipment configuration device 208 can be implemented as operations performed by a data processing apparatus, on data stored on one or more computer-readable storage devices or received from other sources. The term "data processing apparatus" encompasses all kinds of apparatus, devices, and machines for processing data, including, by way of example, a programmable processor, a computer, a system on a chip, or multiple ones, or combinations of the foregoing. The equipment configuration device 208 can also be implemented as special purpose logic circuitry, for example, a field programmable gate array (FPGA) or an application specific integrated circuit (ASIC).

At 220, the network device 202 transmits a reporting message to the controller device 206 to establish a connection with the controller device 206. For example, the reporting message can be sent to the controller device 206 using the received network address of the controller device 206 as a destination address. The received set of connection parameters can be used to establish a secure connection with the controller device 206.

At 222, after establishing a connection with the network device 202, the controller device 206 transmits routing information to the network device 202. In some implementations, the routing information is a flow table that instructs the network device 202 how to route traffic received by the network device 202, for example, from one port to another port of the network device 202.

The equipment configuration device 208 can be located anywhere within a network. In some implementations, the equipment configuration device 208 is co-located with the controller device 206. In some implementations, the equipment configuration device 208 is co-located with the network address server 204. In some implementations, the equipment configuration device 208 is located inside the controller device 206 as a function of the controller device 206. In some implementations, the equipment configuration device 208 is located inside the network address server 204 as a function of the network address server 204. In some implementations, the equipment configuration device 208 can be a software, a hardware, or a combination of both.

For purposes of example, in a Software Defined Network (SDN) (e.g., an OpenFlow network), the network device 202 is a SDN device (e.g., an OpenFlow switch). The network address server 204 is a DHCP server. The controller device 206 is an OpenFlow Controller. The equipment configuration device 208 is an OpenFlow Configuration Point. The database 210 is an OpenFlow network database.

Figure 3:
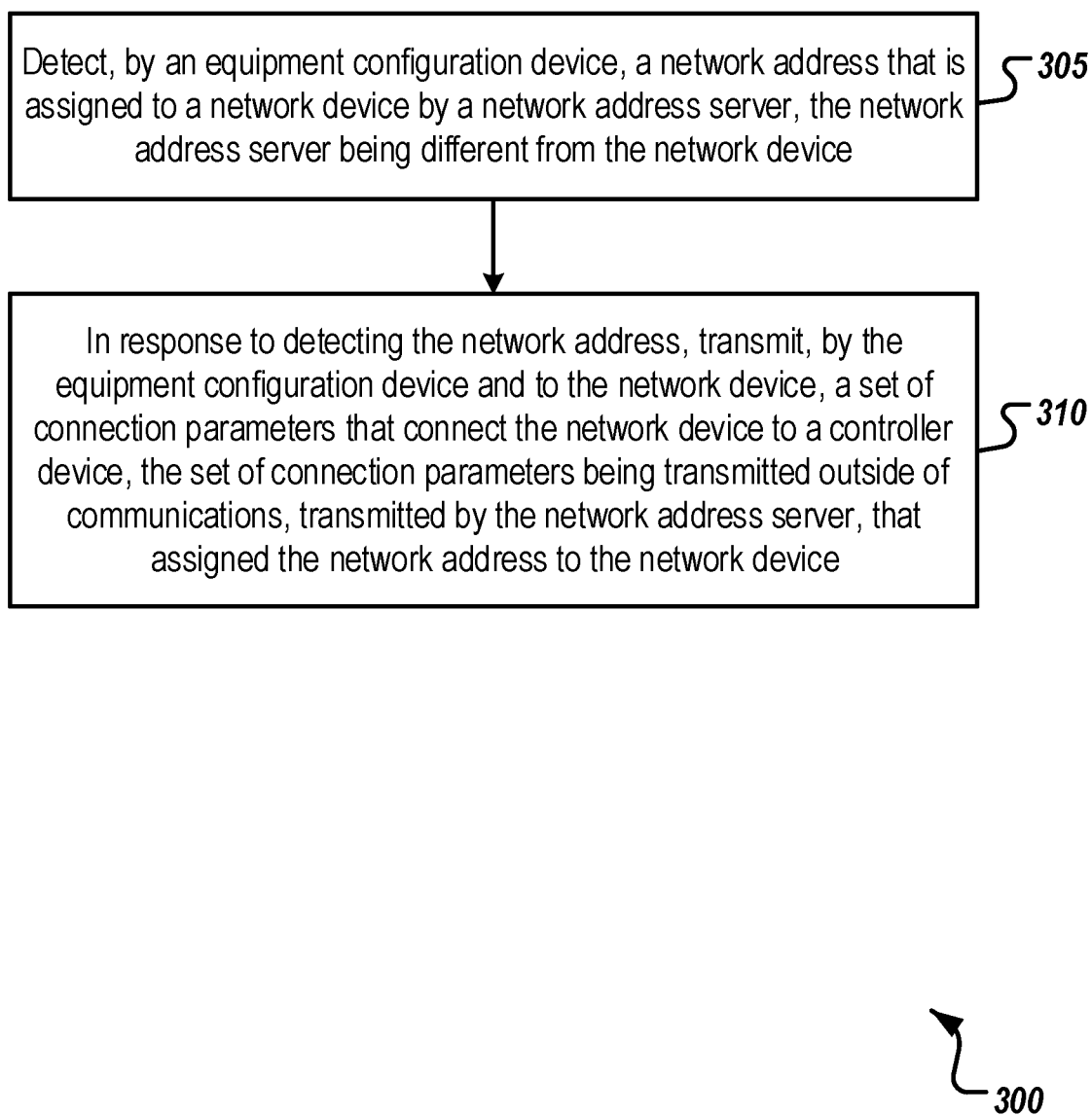
FIG. 3 is a flow chart of an example method for configuring a network device, according to an implementation of the present disclosure.

FIG. 3 is a flow chart of an example method 300 for configuring a network device, according to an implementation of the present disclosure. The example method 300 can be performed, for example, by one or more telecommunications devices, such as those described with reference to FIG. 2 (e.g., the equipment configuration device 208). The example method 300 can also be implemented as instructions stored on a non-transitory, computer-readable medium that, when executed by one or more telecommunications devices (and/or data processing apparatus), configures the one or more telecommunications devices to perform and/or cause the one or more telecommunications devices to perform the actions of the example method 300.

A network address, assigned to a network device by a network address server, is detected by an equipment configuration device (305). The network address server is different from the network device. In some implementations, the network address is an Internet Protocol (IP) address. In some implementations, detecting the network address includes detecting an IP address that is assigned to the network device by a Dynamic Host Configuration Protocol (DHCP) server. For example, the equipment configuration device can monitor DHCP lease information, transmitted by the DHCP server to the network device, and identify, within the DHCP lease information, the IP address that is assigned to the network device as well as one or more identifiers of the network device (e.g., a media access control (MAC) address of the network device). In addition, the equipment configuration device can determine that the network device is a Software Defined Network (SDN) device based on the one or more identifiers of the network device identified within the DHCP lease information.

In some implementations, detecting the network address includes being notified by the network address server when the network address server assigns a network address to the network device. In some implementations, detecting the network address includes monitoring a database for newly stored DHCP lease information, and identifying, within the newly stored DHCP lease information, the network address that is assigned to the network device. In some implementations, detecting the network address includes being notified by a network packet snooping device that monitors and analyzes packets transmitted by the network address server to determine whether a network address has been assigned to the network device.

In response to detecting the network address, a set of connection parameters, that connect the network device to a controller device, is transmitted by the equipment configuration device to the network device (310). The set of connection parameters is transmitted outside of communications, transmitted by the network address server, that assigned the network address to the network device. In some implementations, the controller device is selected from multiple controller devices based on a predetermined rule. For example, the controller device can be selected because it is the closest controller device to the network device. In some implementations, transmitting the set of connection parameters to the network device includes transmitting to the network device, a network address of the controller device. The network address of the controller device can be an IP address of the controller device. In some implementations, transmitting the set of connection parameters to the network device is conditioned on a determination that the network device is a SDN device. In some implementations, the set of connection parameters includes instructions that cause the network device to report a physical configuration of the network device to the controller device. The physical configuration of the network device can include ports information of the network device.

In some implementations, the equipment configuration device is an OpenFlow Configuration Point. The set of connection parameters is transmitted to the network device using an Open vSwitch Database (OVSDB) management protocol or an OpenFlow Management and Configuration (OF-CONFIG) protocol. The controller device is an OpenFlow controller that controls packet routing for the network device.

In some implementations, the equipment configuration device is co-located with the controller device. In some implementations, the equipment configuration device is co-located with the network address server. In some implementations, the equipment configuration device is located inside the controller device as a function of the controller device. In some implementations, the equipment configuration device is located inside the network address server as a function of the network address server. In some implementations, the equipment configuration device is located at a location different from both locations where the controller device and the network address server are located. In some implementations, the equipment configuration device is implemented using software, hardware, or a combination of both.

The example method 300 shown in FIG. 3 can be modified or reconfigured to include additional, fewer, or different actions (not shown in FIG. 3), which can be performed in the order shown or in a different order. For example, after 310, a control path of the network device is configured by the controller device. The control path of the network device controls routing of packets received by the network device. In some implementations, one or more of the actions shown in FIG. 3 can be repeated or iterated, for example, until a terminating condition is reached. In some implementations, one or more of the individual actions shown in FIG. 3 can be executed as multiple separate actions, or one or more subsets of the actions shown in FIG. 3 can be combined and executed as a single action. In some implementations, one or more of the individual actions shown in FIG. 3 may also be omitted from the example method 300.

Figure 4:
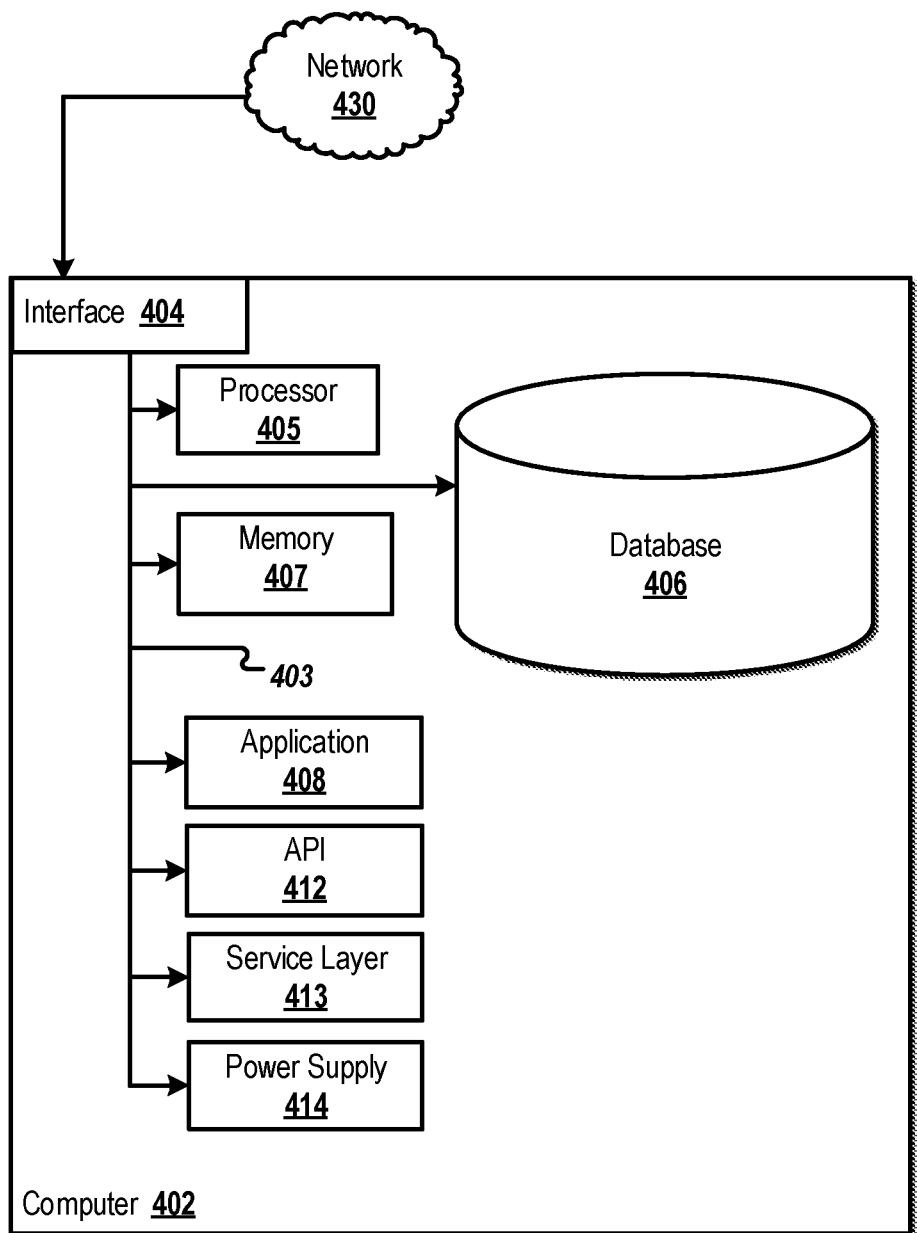
FIG. 4 is a block diagram illustrating an example of a computer system used to provide computational functionalities associated with described algorithms, methods, functions, processes, flows, and procedures, according to an implementation of the present disclosure.

FIG. 4 is a block diagram illustrating an example of a computer system 400 used to provide computational functionalities associated with described algorithms, methods, functions, processes, flows, and procedures, according to an implementation of the present disclosure. The illustrated computer 402 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 402 can comprise a computer that includes an input device, such as a keypad, keyboard, touch screen, another input device, or a combination of input devices that can accept user information, and an output device that conveys information associated with the operation of the computer 402, including digital data, visual, audio, another type of information, or a combination of types of information, on a graphical-type user interface (UI) (or GUI) or other UI.

The computer 402 can serve in a role in a computer system as a client, network component, a server, a database or another persistency, another role, or a combination of roles for performing the subject matter described in the present disclosure. The illustrated computer 402 is communicably coupled with a network 430. In some implementations, one or more components of the computer 402 can be configured to operate within an environment, including cloud-computing-based, local, global, another environment, or a combination of environments.

At a high level, the computer 402 is an electronic computing device operable to receive, transmit, process, store, or manage data and information associated with the described subject matter. According to some implementations, the computer 402 can also include or be communicably coupled with a server, including an application server, e-mail server, web server, caching server, streaming data server, another server, or a combination of servers.

The computer 402 can receive requests over network 430 (for example, from a client software application executing on another computer 402) and respond to the received requests by processing the received requests using a software application or a combination of software applications. In addition, requests can also be sent to the computer 402 from internal users (for example, from a command console or by another internal access method), external or third-parties, or other entities, individuals, systems, or computers.

Each of the components of the computer 402 can communicate using a system bus 403. In some implementations, any or all of the components of the computer 402, including hardware, software, or a combination of hardware and software, can interface over the system bus 403 using an application programming interface (API) 412, a service layer 413, or a combination of the API 412 and service layer 413. The API 412 can include specifications for routines, data structures, and object classes. The API 412 can be either computer-language independent or dependent and refer to a complete interface, a single function, or even a set of APIs. The service layer 413 provides software services to the computer 402 or other components (whether illustrated or not) that are communicably coupled to the computer 402. The functionality of the computer 402 can be accessible for all service consumers using this service layer. Software services, such as those provided by the service layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 402, alternative implementations can illustrate the API 412 or the service layer 413 as stand-alone components in relation to other components of the computer 402 or other components (whether illustrated or not) that are communicably coupled to the computer 402. Moreover, any or all parts of the API 412 or the service layer 413 can be implemented as a child or a sub-module of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402. The interface 404 is used by the computer 402 for communicating with another computing system (whether illustrated or not) that is communicatively linked to the network 430 in a distributed environment. Generally, the interface 404 is operable to communicate with the network 430 and comprises logic encoded in software, hardware, or a combination of software and hardware. More specifically, the interface 404 can comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors can be used according to particular needs, desires, or particular implementations of the computer 402. Generally, the processor 405 executes instructions and manipulates data to perform the operations of the computer 402 and any algorithms, methods, functions, processes, flows, and procedures as described in the present disclosure.

The computer 402 also includes a database 406 that can hold data for the computer 402, another component communicatively linked to the network 430 (whether illustrated or not), or a combination of the computer 402 and another component. For example, database 406 can be an in-memory, conventional, or another type of database storing data consistent with the present disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases of similar or differing types can be used according to particular needs, desires, or particular implementations of the computer 402 and the described functionality. While database 406 is illustrated as an integral component of the computer 402, in alternative implementations, database 406 can be external to the computer 402.

The computer 402 also includes a memory 407 that can hold data for the computer 402, another component or components communicatively linked to the network 430 (whether illustrated or not), or a combination of the computer 402 and another component. Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 or similar or differing types can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in the present disclosure. For example, application 408 can serve as one or more components, modules, or applications. Further, although illustrated as a single application 408, the application 408 can be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or another power management functionality). In some implementations, the power-supply 414 can include a power plug to allow the computer 402 to be plugged into a wall socket or another power source to, for example, power the computer 402 or recharge a rechargeable battery.

There can be any number of computers 402 associated with, or external to, a computer system containing computer 402, each computer 402 communicating over network 430. Further, the term "client," "user," or other appropriate terminology can be used interchangeably, as appropriate, without departing from the scope of the present disclosure. Moreover, the present disclosure contemplates that many users can use one computer 402, or that one user can use multiple computers 402.

While this specification contains many specific implementation details, these should not be construed as limitations on the scope of any inventions or of what may be claimed, but rather as descriptions of features specific to particular embodiments of particular inventions. Certain features that are described in this specification, in the context of separate embodiments, can also be implemented in combination or in a single embodiment. Conversely, various features that are described in the context of a single embodiment can also be implemented in multiple embodiments, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
   detecting, by an equipment configuration device, a network address that is assigned to a network device by a network address server, wherein the network address server differs from the network device; and
   in response to detecting the network address, transmitting, by the equipment configuration device and to the network device, a set of connection parameters that connect the network device to a controller device, wherein the set of connection parameters is transmitted outside of communications, transmitted by the network address server, that assigned the network address to the network device, wherein the set of connection parameters includes a network address of the controller device and security information required to establish a connection with the controller device, and wherein the set of connection parameters includes instructions that cause the network device to report a physical configuration of the network device to the controller device.

2. The method of claim 1, wherein detecting the network address comprises detecting an Internet Protocol (IP) address that is assigned to the network device by a Dynamic Host Configuration Protocol (DHCP) server.

3. The method of claim 2, wherein detecting the network address comprises:
   monitoring DHCP lease information transmitted by the DHCP server; and
   identifying, within the DHCP lease information, the IP address that is assigned to the network device as well as one or more identifiers of the network device, the method further comprising:
      determining that the network device is a software defined network (SDN) device based on the one or more identifiers of the network device identified within the DHCP lease information, wherein transmitting the set of connection parameters to the network device is conditioned on the determination that the network device is a SDN device.

4. The method of claim 1, wherein:
   the equipment configuration device is an OpenFlow Configuration Point;
   the set of connection parameters is transmitted to the network device using an Open vSwitch Database (OVSDB) management protocol or an OpenFlow Management and Configuration (OF-CONFIG) protocol; and
   the controller device is an OpenFlow controller that controls packet routing for the network device.

5. A telecommunications device, comprising:
   a transceiver that transmits and receives data over a telecommunications network;
   a memory; and
   one or more processors coupled to the transceiver and the memory, wherein the one or more processors are configured to perform operations comprising:

detecting a network address that is assigned to a network device by a network address server, wherein the network address server differs from the network device; and in response to detecting the network address, transmitting, to the network device, a set of connection parameters that connect the network device to a controller device, wherein the set of connection parameters is transmitted outside of communications, transmitted by the network address server, that assigned the network address to the network device, wherein the set of connection parameters includes a network address of the controller device and security information required to establish a connection with the controller device, and wherein the set of connection parameters includes instructions that cause the network device to report a physical configuration of the network device to the controller device.

6. The telecommunications device of claim 5, wherein detecting the network address comprises detecting an Internet Protocol (IP) address that is assigned to the network device by a Dynamic Host Configuration Protocol (DHCP) server.

7. The telecommunications device of claim 6, wherein detecting the network address comprises:

monitoring DHCP lease information transmitted by the DHCP server; and identifying, within the DHCP lease information, the IP address that is assigned to the network device as well as one or more identifiers of the network device, the operations further comprising:

determining that the network device is a software defined network (SDN) device based on the one or more identifiers of the network device identified within the DHCP lease information, wherein transmitting the set of connection parameters to the network device is conditioned on the determination that the network device is a SDN device.

8. The telecommunications device of claim 5, wherein:

the telecommunications device is an OpenFlow Configuration Point;

the set of connection parameters is transmitted to the network device using an Open vSwitch Database (OVSDB) management protocol or an OpenFlow Management and Configuration (OF-CONFIG) protocol; and the controller device is an OpenFlow controller that controls packet routing for the network device.

9. A telecommunications system, comprising:
a controller device; and
an equipment configuration device that transmits and receives data over a telecommunications network, wherein the equipment configuration device is configured to perform operations comprising:

detecting a network address that is assigned to a network device by a network address server, wherein the network address server differs from the network device; and in response to detecting the network address, transmitting, to the network device, a set of connection parameters that connect the network device to the controller device, wherein the set of connection parameters is transmitted outside of communications, transmitted by the network address server, that assigned the network address to the network device, wherein the set of connection parameters includes a network address of the controller device and security information required to establish a connection with the controller device, and wherein the set of connection parameters includes instructions that cause the network device to report a physical configuration of the network device to the controller device.

10. The telecommunications system of claim 9, wherein detecting the network address comprises detecting an Internet Protocol (IP) address that is assigned to the network device by a Dynamic Host Configuration Protocol (DHCP) server.

11. The telecommunications system of claim 10, wherein detecting the network address comprises:

monitoring DHCP lease information transmitted by the DHCP server; and identifying, within the DHCP lease information, the IP address that is assigned to the network device as well as one or more identifiers of the network device, the operations further comprising:

determining that the network device is a software defined network (SDN) device based on the one or more identifiers of the network device identified within the DHCP lease information, wherein transmitting the set of connection parameters to the network device is conditioned on the determination that the network device is a SDN device.

12. The telecommunications system of claim 9, wherein:

the equipment configuration device is an OpenFlow Configuration Point;

the set of connection parameters is transmitted to the network device using an Open vSwitch Database (OVSDB) management protocol or an OpenFlow Management and Configuration (OF-CONFIG) protocol; and the controller device is an OpenFlow controller that controls packet routing for the network device.

* * * * *